United States Patent
Pinvidic et al.

(10) Patent No.: US 6,470,461 B1
(45) Date of Patent: Oct. 22, 2002

(54) DISK DRIVE CONTROLLER CIRCUIT AND METHOD FOR SKIPPING DEFECTIVE AND/OR UNDESIRED SECTORS

(75) Inventors: Daniel R. Pinvidic, Fountain Valley, CA (US); Gregory T. Elkins, Orange, CA (US); Stanley K. Cheong, Los Angeles, CA (US)

(73) Assignee: QLogic Corporation, Aliso Viejo, CA (US)

( * ) Notice: Subject to any disclaimer, the term of this patent is extended or adjusted under 35 U.S.C. 154(b) by 0 days.

(21) Appl. No.: 09/326,851

(22) Filed: Jun. 7, 1999

(51) Int. Cl.[7] ............................................. G06F 11/20
(52) U.S. Cl. ................................................... 714/8
(58) Field of Search ........................... 714/8, 7, 42, 54, 714/710, 711; 365/200, 201

(56) References Cited

U.S. PATENT DOCUMENTS

| | | | |
|---|---|---|---|
| 5,271,018 A | * 12/1993 | Chan | 371/10.2 |
| 5,500,848 A | 3/1996 | Best et al. | |
| 5,615,190 A | 3/1997 | Best et al. | |
| 5,822,142 A | 10/1998 | Hicken | |
| 5,835,930 A | * 11/1998 | Dobbek | 711/4 |
| 5,937,435 A | * 8/1999 | Dobbeck et al. | 711/202 |
| 6,201,655 B1 | * 3/2001 | Watanabe et al. | 360/53 |
| 6,223,303 B1 | * 4/2001 | Billings et al. | 714/8 |
| 6,279,089 B1 | * 8/2001 | Schibilla et al. | 711/162 |
| 2001/0044873 A1 | * 11/2001 | Wilson et al. | 711/4 |

FOREIGN PATENT DOCUMENTS

| | | |
|---|---|---|
| EP | 0 718 827 A2 | 12/1995 |
| GB | 2 285 166 | 6/1995 |

OTHER PUBLICATIONS

PCT International Search Report, Doc. No. PCT/US00/15084, Dated Nov. 15, 2000.

* cited by examiner

Primary Examiner—Scott Baderman
(74) Attorney, Agent, or Firm—Knobbe, Martens, Olson & Bear, LLP

(57) ABSTRACT

In a disk drive, a disk drive controller circuit and method keep track of defective and/or undesired sectors on a disk and skip such defective or undesired sectors during a read or write operation requested by a host system. A microprocessor is programmed to respond to a read or write command from the host system by converting a list of sectors to be skipped to an address and range format suitable for loading a set of registers within the controller circuit. The microprocessor loads the set of registers, and the controller circuit compares each sector identified by the read or write command with the contents of the set of registers. If a sector identified by the read or write command matches one of the sectors to be skipped, the controller circuit skips that sector during the read or write operation.

29 Claims, 8 Drawing Sheets

DISK DRIVE CONTROLLER CIRCUIT AND METHOD FOR SKIPPING DEFECTIVE AND/OR UNDESIRED SECTORS

BACKGROUND OF THE INVENTION

1. Field of the Invention

The present invention relates generally to computer system mass storage devices. Specifically, the present invention relates to a disk drive controller circuit and method for checking and managing defective and/or undesired sectors on a disk.

2. Brief Description of the Related Art

Computer systems often include a host system and one or more peripheral storage devices that store and/or provide access to data. One type of peripheral storage device is a hard disk drive. A hard disk drive typically comprises at least one platter (collectively "the disk"), which is rotated by a motor, an actuator that moves a transducer to various locations over the disk, a microprocessor, a disk drive controller ("controller") and various other electrical circuitry. The controller is typically an integrated circuit which is mounted to a printed circuit board within the disk drive. The microprocessor can be physically embedded within or external to the controller integrated circuit.

The controller (under the control of the microprocessor) commonly controls most of the operations of the disk drive, including handling data from the host computer ("host system" or simply "host") to be stored on a disk during a write operation and passing data back to a requesting host computer during a read operation. The controller is used to retrieve and send data to and from the disk surface. The controller commonly encodes the data so that it can be successfully transferred to and from the disk.

The disk often includes a set of rotating platters which store data. Data can be written to the disk or read from the disk any number of times, and the data remains intact after the disk drive is turned off. A platter may have two writable surfaces. Each writable surface stores data on concentric rings called tracks. The number of tracks may vary from disk to disk. The tracks are divided radially into sectors, which are the smallest writable/readable unit of a track. The number of sectors may vary per track and may vary from disk to disk because disk manufacturers may have different disk configurations. There may be 200 or more sectors per track. Each sector includes data, information about the sector, and synchronization information.

There are two general types of defects which can occur on a disk platter: manufacturing defects and grown defects. Manufacturing defects are defects that occur and are detected during manufacture. When disks are formatted at the factory during manufacture, a factory algorithm determines which sectors are initially defective and creates a list of sector addresses of all detected manufacturing defects. The procedure of recording manufacturing defects may be different from disk to disk and may be unique to each disk manufacturer. The factory algorithm stores the list of manufacturing defect addresses on the disk of the disk drive as either physical addresses or logical block addresses, depending on the manufacturer's defined implementation of its disk drive. The disk drive uses the list to perform 'slipping,' which means for every sector with a manufacturing defect, the address (either physical or logical, depending on the manufacturer's defined implementation) of the next sector to be read or written is logically incremented from the address of the last good sector. Thus, during disk drive operation, the disk drive does not read or write a sector with a manufacturing defect because the address of that sector has been incremented to the next good sector.

The other general type of defects are called grown defects, which occur and/or are detected after manufacture. Grown defects include sectors which the disk drive determines to be unreadable or unusable, such as during a format operation. Grown defects are detected and recorded typically when a sector is read, but the process may differ depending on the manufacturer's defined implementation. The data from each sector with a grown defect is re-assigned to a non-defective sector.

As with manufacturing defects, the locations of grown defects and their re-assigned sector addresses are typically stored on the disk as either physical or logical addresses, depending on the manufacturer's defined implementation. The grown defect locations may be transferred from the disk to a random access memory (RAM) each time the disk drive is powered on.

Some disk drive controllers include one or more registers which are used to temporarily store the addresses of defective sectors to be skipped or re-assigned during a current read or write operation.

SUMMARY OF THE INVENTION

One drawback with some disk drive controllers is the limited number of registers in the disk drive controller which are assigned to identify defective sectors on a track to be skipped or re-assigned during a read or write operation. The number of registers restricts the total number of defective sectors that can be skipped or re-assigned during a read or write operation. In some disk drives, the number of defects on a particular track may be greater than the number of available registers used to identify defects on a track. Adding more registers would require adding more gates, which increases the cost of manufacturing the disk drive controller.

In addition to manufacturing costs, another drawback to adding more registers is trying to guess in advance how many registers are sufficient to handle all the defects of a particular track of a particular disk platter. Different disk platters may have a different number of sectors per track and a different number of tracks. Moreover, as disk technology improves, the number of sectors per track may increase, which may lead to more defective sectors to be managed, skipped, and/or re-assigned by the disk drive controller.

One solution is to partition the defect management operation into multiple parts because the controller can only skip a certain number of defective sectors for a given read or write operation (based on the limited number of registers). If each part of a multi-part defect management operation skipped or re-assigned a particular number of defective sectors, then there may be enough registers to handle most or all of the defects on a particular track. But splitting the defect management operation into multiple parts increases the time of the overall defect management operation and degrades disk drive performance. An important goal in current disk drives is to minimize the amount of time for read and write operations.

The present invention relates to a disk drive controller circuit and method for keeping track of defective and/or undesired sectors on a disk and skipping such defective or undesired sectors during read or write operations. The present invention recognizes and takes advantage of the fact that defective sectors tend to be in close proximity with each other and are often found together in groups of contiguous or consecutive sectors. The disk drive controller of the present invention uses 'skip range check registers' or 'skip check registers' which can store the locations of ranges of consecutive defective sectors.

By storing the defective sector information within the controller as ranges of defective sectors, the present invention may reduce the quantity of registers and/or register logic needed to keep track of defects. Alternatively, the present invention may increase (over prior designs) the number of defective sectors that can be handled during a read or write operation without a substantial increase in register logic.

Furthermore, because the disk drive is configured to read or write data on a track continuously sector-by-sector, the skip range check registers allow the controller to quickly skip the defective sectors in groups instead of single units. Thus, the disk drive controller circuit and method of the present invention reduces the problems of adding more registers, trying to guess how many more registers are needed, and partitioning the defect management operation into multiple parts.

Various disk drive manufacturers may use various defect management schemes. Any one of a variety of known defect management schemes may be used with the present invention.

One embodiment also allows the host system to skip or mask certain undesired sectors during a read or write operation. These sectors are not defective, but they are undesired by the host system during a particular read or write operation.

One aspect of the present invention relates to a disk drive controller in a disk drive configured to read and write data to one or more sectors on one or more tracks of a disk as requested by a host system. The disk drive controller comprises at least one register configured to store (a) a sector address of a first sector to be skipped during a read or write operation; and (b) a range value which indicates a number of consecutive sectors to be skipped during the read or write operation. The disk drive controller further comprises a control circuit configured to use the sector address and the range value to skip a range of consecutive sectors during the read or write operation. In one configuration, the control circuit comprises a state machine. One configuration of the register further comprises a re-assign bit which indicates that a particular sector or range of consecutive sectors have been re-assigned and should be skipped. Another configuration of the register further comprises an increment logical block address (LBA) bit which allows the host system to direct the controller to skip certain undesired (but not defective) sectors during a read or write operation.

Another aspect of the present invention relates to a method of skipping one or more sectors on a disk of a disk drive during a read or write operation requested by a host system. The method comprises generating a list of sectors to be skipped during the read or write operation; identifying within the list at least one range of consecutive sectors to be skipped; converting the range into an address and a range value to generate a compressed list; and loading the compressed list into a set of registers of a disk drive controller.

DETAILED DESCRIPTION OF THE PREFERRED EMBODIMENTS

A preferred embodiment of the present invention is described herein, which is intended to illustrate, and not limit, the scope of the invention.

Figure 1:
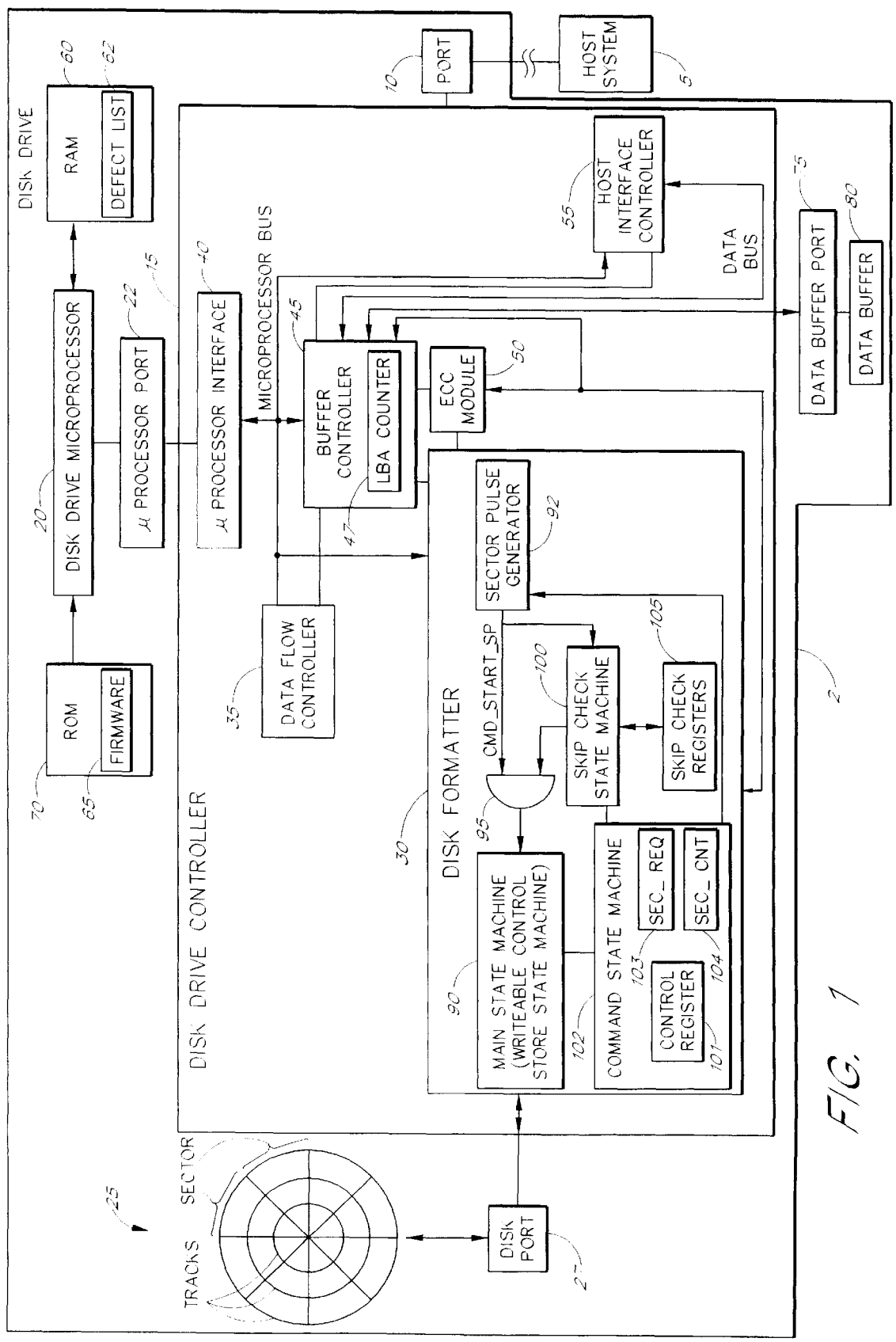
FIG. 1 illustrates a host system and a disk drive according to one embodiment of the invention and illustrates a host system connected to the disk drive.

FIG. 1 illustrates a disk drive 2 according to one embodiment of the invention. The disk drive 2 is shown together with a host system (host) 5, which may, for example, be a personal computer (PC). The disk drive 2 comprises a disk drive controller circuit (controller) 15, a host interface port 10, a disk port 27, a local or disk drive microprocessor (microprocessor) 20, a microprocessor port 22, a data buffer port 75, a read-only memory (ROM) 70, a random-access memory (RAM) 60 and a data buffer 80. The disk drive controller 15 reads and writes data to a disk 25.

The host interface port 10 may, for example, be a Small Computer Standard Interface (SCSI) port, an Advanced Technology Attachment (ATA) bus port, or a Fibre Channel port. The microprocessor 20 is preferably a general purpose microcontroller, and may be either physically embedded within the controller 15 or external to the controller 15. The data buffer 80 may be either inside or outside the controller 15. The ROM 70 stores an executable firmware 65, which may be copied to the RAM 60 at boot-up and executed by the microprocessor 20. Alternatively, the ROM 70 may store a set of instructions to download firmware from the disk 25 to the RAM 60.

The RAM 60 stores a defect list 62 which is loaded from the disk 25 or any other suitable location by the firmware 65 at boot-up. The defect list 62 may be a master list of all manufacturing and grown defects for the entire disk 25. Alternatively, in another configuration, the defect list 62 may be loaded into RAM 60 by the firmware 65 at the beginning of each read or write operation. In this configuration, the defect list 62 may be a portion of the master list of all manufacturing and grown defects for the entire disk 25. In this configuration, the firmware 65 may load a part of the master list on a track-by-track basis or a zone-by-zone basis (depending on the manufacturer's defined implementation) as needed by a read or write command.

In the illustrated embodiment of FIG. 1, the disk drive controller 15 comprises a microprocessor interface 40, a data flow controller 35, a buffer controller 45, an error correction code (ECC) module 50, a disk formatter 30 and a host interface controller 55. The host interface controller 55 may comprise a SCSI controller or SCSI processor, an ATA processor or a Fibre Channel interface manager. The buffer controller 45 includes at least one logical block address (LBA) counter 47, which counts the logical block addresses of the sectors associated with a read or write operation.

The disk formatter 30 comprises a main state machine 90, a sector pulse generator 92, an AND logical function gate 95, a command state machine 102, a skip check state machine 100 and a set of skip check registers 105. The disk formatter registers comprise a disk formatter control register 101, a SEC_REQ register 103 and a SEC_CNT register 104. Alternatively, in other configurations, other circuit architectures may be used to implement the disclosed functions.

General Operation Controller and Microprocessor

Figure 7:
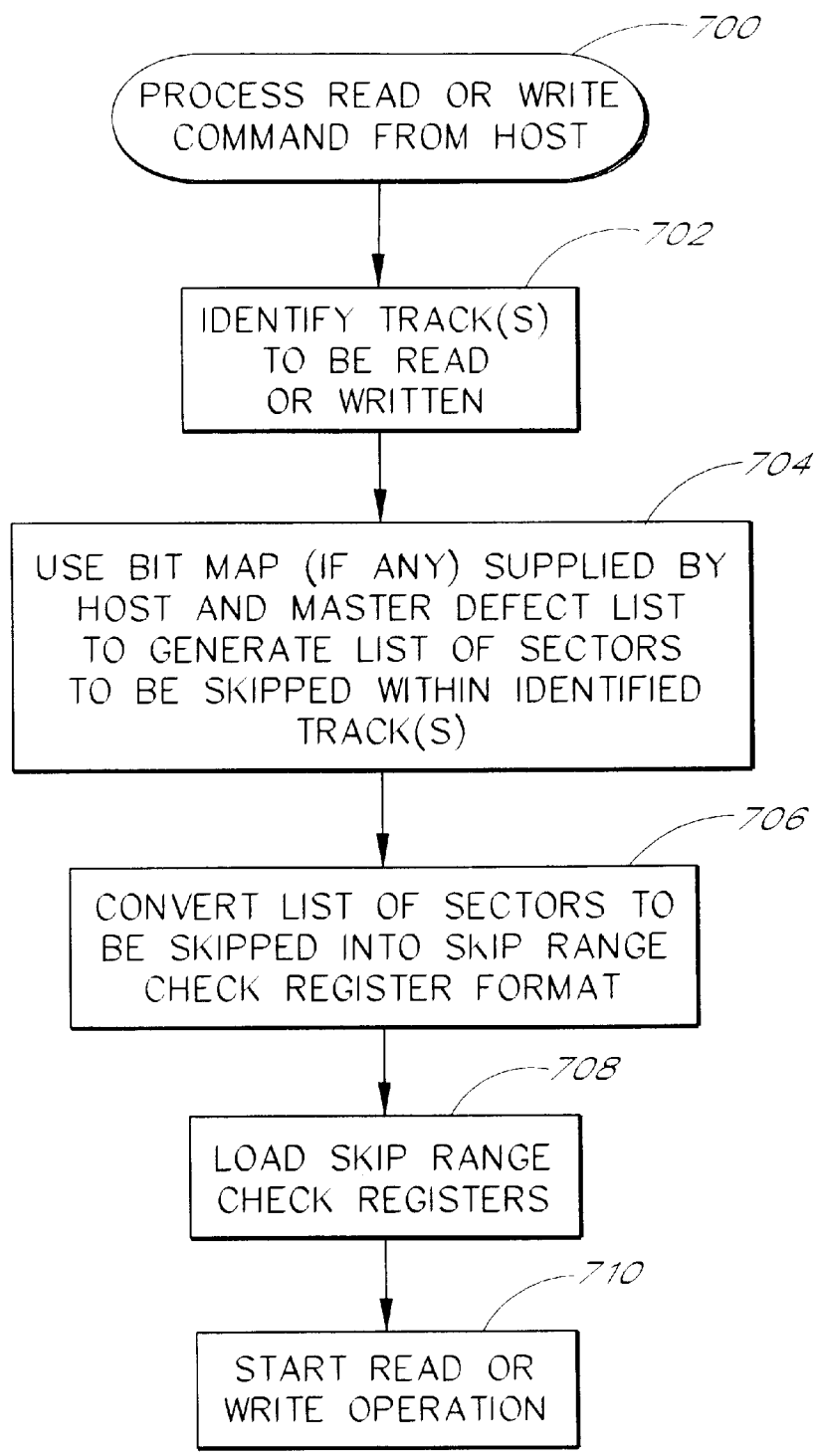
FIG. 7 illustrates a one configuration of a firmware method performed by the disk drive of FIG. 1.

The general operation of the disk drive controller 14 and microprocessor 20 is described with reference to FIGS. 1 and 7. FIG. 7 illustrates one configuration of a firmware method performed by the disk drive 2 of FIG. 1. In a process block 700 of FIG. 7, the disk drive 2 receives and processes a read or write command from the host system 5. Specifically, the host 5 initiates a disk drive operation by sending a read or write command to the host interface controller 55 of the disk drive controller 15. The microprocessor 20 reads the read or write command from the host interface controller 55. The read or write command starts at a selected logical block address and may involve more than one track.

In a process block 702, the microprocessor 20 executes firmware 65 which identifies the track(s) to be read or written. The firmware 65 converts or translates the logical block addresses of the read or write command into specific physical sector locations (addresses) to be read or written on the disk 25. The translation is defined by a manufacturer's implementation of its disk drive.

In a process block 704, the firmware 65 generates a list of sectors to be skipped within the identified track(s) of the read or write operation. To generate this list, the firmware 65 may use a bit map, if any (such as the one illustrated in FIG. 4), associated with the read or write command and the defect list 62 from the disk 25. As described above, the defect list 62 used by the firmware 65 may be a master list of all manufacture and grown defects on the disk 25 or a portion of the master list.

In a process block 706, the firmware 65 converts the list 62 of sectors to be skipped into an appropriate format for loading the skip range check registers 105. This includes, for example, combining consecutive defective sector addresses into a starting address and a range (or length) of consecutive defective sector addresses. Thus, the defect list 62 is converted to a condensed or compressed list. The firmware 65 also uses the defect list 62 to generate a re-assign bit (to be loaded into the re-assign bit 162 of the skip check register set 170) for sectors, specified by the read or write command, with grown defects.

In a process block 708, the firmware 65 loads all of the required control parameters to perform the command into the appropriate registers of the controller 15, such as the disk formatter control register 101, the SEC_REQ register 103, the SEC_CNT register 104 and the skip check registers 105. For the skip check register configuration of FIG. 3, the firmware 65 loads the four fields 162–168 as required.

One of the purposes of the control parameters is to specify which physical sectors and which tracks will be written to or read. The SEC_REQ register 103 initially contains the start or first sector address (address of the lowest physical sector address) identified for executing a read or write command from the host system 5. The SEC_CNT register 105 initially specifies the total number of sectors identified by the read or write command, and during the course of the operation, specifies the number of remaining sectors to be processed.

After the registers 101, 103, 104 and 105 are loaded, the firmware 65 issues a read/write command to the disk formatter 30, as shown in a process block 710. The disk formatter 30 preferably executes the command automatically with no further intervention by the microprocessor 20.

The sector pulse generator 92 generates a start command sector pulse (CMD_START_SP) to the AND logical function gate 95. The CMD_START_SP identifies the first specified sector ID, SEC_REQ. The sector pulse generator 92 also sends the CMD_START_SP to the skip check state machine 100.

The skip check state machine 100 determines whether the value stored in the SEC_REQ register 103 refers to a sector to be skipped. The skip check state machine 100 generates an output which is input into the AND gate 95, along with the CMD_START_SP from the sector pulse generator 92. If the output of the skip check state machine 100 is 'low,' then the sector is skipped. If the output of the skip check state machine 100 is 'high,' then the sector is not skipped. The output of the AND gate 95 is input into the main state machine 90.

The skip check state machine 100 checks for defective sectors using the contents of the skip check registers 105. The skip check state machine 100 stops the operation if it detects an address to a sector that is designated as a sector to be re-assigned because of a grown defect. The firmware 65 then uses a re-assign algorithm to re-assign the data to a sector without grown defects (e.g., for a write operation) or to identify a replacement sector (e.g., for a read operation).

When the command is complete, the disk formatter 30 sends an interrupt to the microprocessor 20 and/or sets a flag. The interrupt may indicate that the command is complete, and the disk formatter 30 is ready to execute another command.

Read or Write

In one configuration, if the command from the host 5 is a read command, the requested data is read from the disk 25 into the data buffer 80. When a certain amount of data is in the buffer 80, the microprocessor 20 causes the controller 15 to send the data from the buffer 80 to the host 5. If the command from the host 5 is a write command, the disk formatter 30 and the ECC module 50 encode the data before it is stored on the disk 25.

Firmware Functions

The firmware 65 is preferably configured to execute three primary functions that relate to the defect management scheme. At boot-up, the firmware 65, when executed by the microprocessor 20, causes the disk drive controller 15 to read the list of sectors with manufacturing defects from the disk 25 and stores this list in the RAM 60, a data buffer or some other area (unknown to the disk controller). The list may relate to a zone, a platter or some other unit designated by the disk drive manufacturer. During a read or write operation, the firmware 65 transfers a part of this list to the disk formatter 30. The transferred part of the list covers the particular track(s) which is related to the sectors specified by the host system 5. The disk formatter 30 skips over certain sectors of the track(s) according to the transferred partial list. This is part of the defect management operation described above.

The firmware 65 also re-assigns sectors with grown defects. The re-assign procedure may vary depending on the disk drive manufacture's implementation. When an error is encountered, such as during a read operation, the firmware 65 attempts to recover the data and re-assign the data to an alternate 'good' sector that is not defective. The good sector may be located anywhere on the disk 25. The firmware 65 controls and maintains a record of sector re-assignments. At the beginning of a subsequent read or write operation (after the data has been re-assigned), the firmware 65 programs the location of one or more defective sectors to be skipped into the skip check registers 105 within the disk drive formatter 30. Re-assigned sectors cause the firmware 65 (and the disk formatter 30) to read or write up to the re-assign address, determine the address of the re-assigned sector, read or write this sector, and then return to the remaining sectors of the read or write command.

Before a read or write operation, the firmware 65 may also program the disk formatter 30 to skip certain sectors which are undesired by the read or write command from the host 5. Undesired sectors are not defective (they contain valid, readable data), but they are not identified by the host system 5 to be transferred for various reasons. For example, certain sectors may not be used in a specialized command set, such as 'skip mask read' and 'skip mask write' used in redundant array of inexpensive disk (RAID) controllers. The SCSI protocol, for example, has specialized commands which may be used to exclude certain undesired sectors or a range of sectors.

The firmware 65 preferably reprograms the registers 101, 103, 104 and the skip registers 105 before each new read or write operation because the control parameters may be different for each read or write operation.

Overview of Defect Management Operation—Main St Mach. and Skip St Mach. Function One part of the defect management operation is described with reference to FIG. 1. After the first sector is checked, the main state machine 90 of the disk formatter 30 preferably operates in parallel with the skip check state machine 100. The skip check state machine 100 performs a skip check procedure on subsequent identified sectors while the main state machine 90 performs other processing functions.

SEC_REQ and SEC_CNT

The skip check state machine 100 checks the skip registers 105 to determine whether the sector address of a requested sector (SEC_REQ) is designated as a skip sector by the firmware 65. The SEC_REQ register 103 preferably acts as a counter, which is incremented by 1 after each requested sector address (requested by the read or write operation) is checked against the skip sector addresses (designated as a skip sector by the firmware 65) stored in the skip registers 105.

If the requested sector (SEC_REQ) is designated as a skip sector, the skip check state machine 100 skips that sector and checks the next sequential sector (SEC_REQ+1) on the track. If the sector is not designated as a skip sector, the skip check state machine 100 allows the main state machine 90 to process the sector, and the main state machine 90 reads or writes data to or from the sector. The main state machine 90 decrements the total number of requested sectors (SEC_CNT) by 1 after each sector is successfully found and read or written. When SEC_CNT is decremented to zero, the read or write operation is complete.

Existing Skip Register Configuration

Figure 2A:
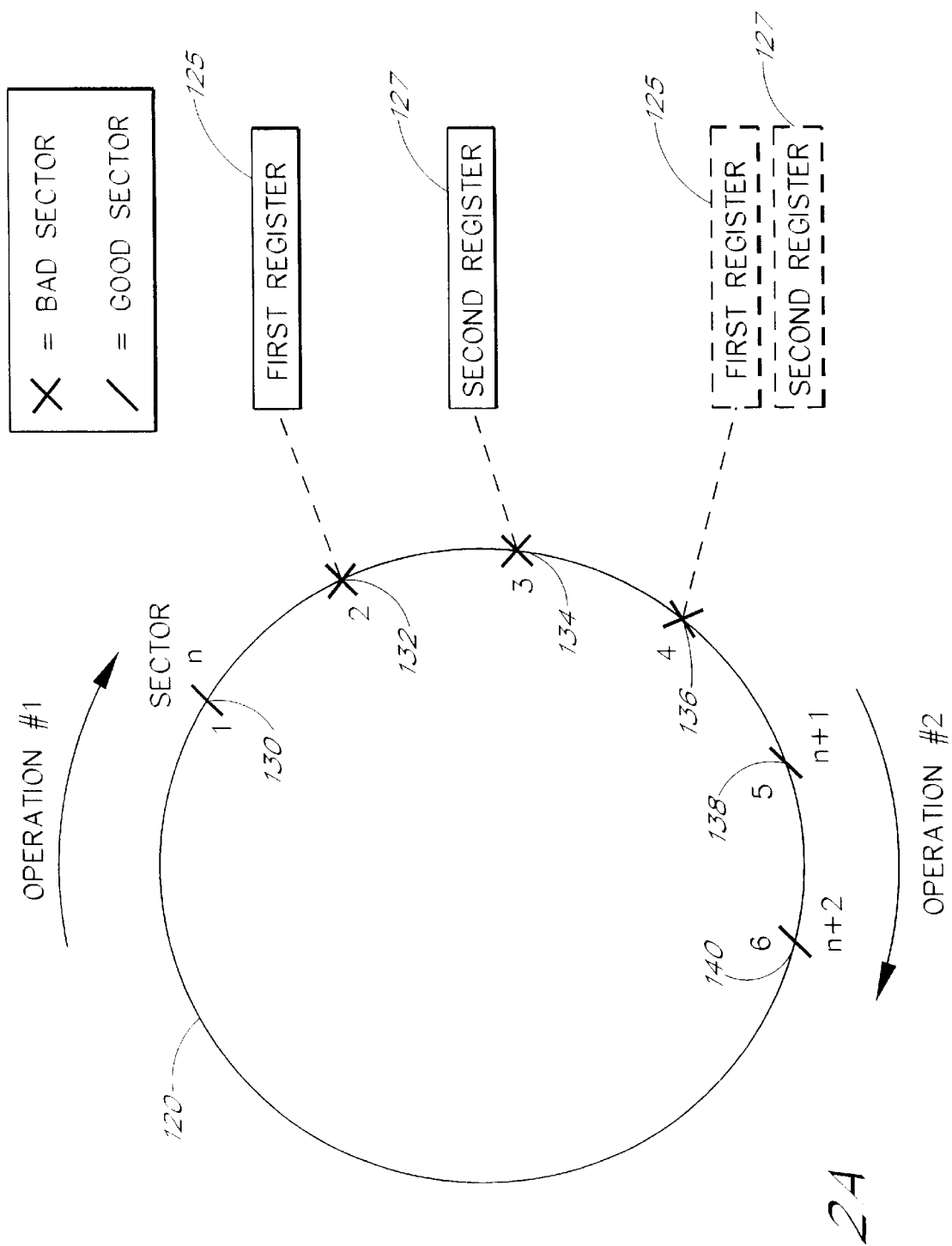
FIG. 2A illustrates an example of a track on a disk and two skip registers.

FIG. 2A illustrates an example of a track 120 on the disk 25, a first skip register 125 and a second skip register 127, and will be used to illustrate a deficiency in existing designs. Only 6 sectors 130–140 and two skip registers 125, 127 are shown for purposes of this example. But a track may comprise 200 or more sectors, and a disk formatter 30 may have several skip registers.

In FIG. 2A, each skip register 125, 127 can store or map the location (also called a sector address or a sector ID) of a single defective sector. But the number of defective sectors on a track to be read or written may be greater than the number of skip registers. For example, as shown in FIG. 2A, there are three defective sectors 132–136 and only 2 skip registers 125, 127. In one existing method, the disk formatter 30 partitions a read or write operation intended for the track 120 into at least two operations because its defect management operation can only handle a limited number of sectors to be skipped, which is two in this example. A first defect management operation would use the first skip register 125 to store the location of the first sector defect 132 and use the second skip register 127 to store the location of the second sector defect 134. A second defect management operation would use the first skip register 125 to store the location of the third sector defect 136. A first read operation would read up to sector n 130, and a second read operation would read from n+1 to any other sectors further along the track 120.

One disadvantage of partitioning the defect management operation is that is increases the time needed to complete the read or write operation, and thereby reduces disk drive performance.

Skip Range Check Register

Figure 2B:
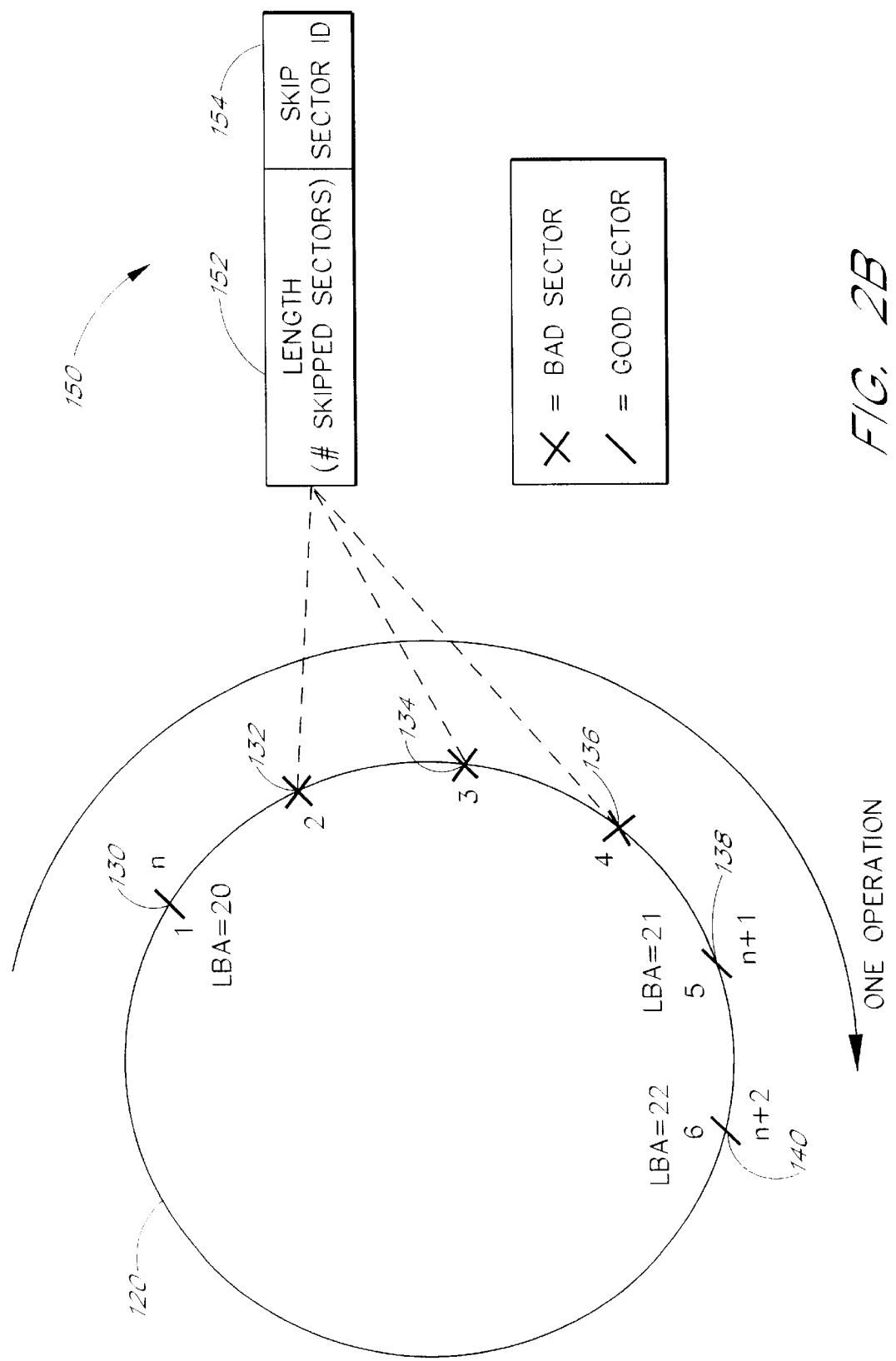
FIG. 2B illustrates an example of a track on a disk and one configuration of a skip range check register in the disk drive of FIG. 1.

FIG. 2B illustrates a disk track 120 and one configuration of a skip range check register 150 in accordance with one embodiment of the present invention. In FIG. 2B, the skip range register 150 comprises a skip sector location or ID field 154 (SKIP_ID) and a length field 152 (LENGTH). The skip sector ID field 154 specifies the sector location of a first sector to be skipped on the track 120, such as the first defective sector 132 shown in FIG. 2B. In a preferred configuration, this skip sector ID is a physical address, not a logical address.

The LENGTH field 152 specifies the number of consecutive defective sectors which should be skipped, starting with the first defective sector 132. A LENGTH of '1' indicates that only the sector at the SKIP_ID address is to be skipped. A LENGTH of '2' indicates that the two sectors at the SKIP_ID and the SKIP_ID+1 addresses are to be skipped. For example, for the track 120 shown in FIG. 2B, the LENGTH field 152 is three. The LENGTH field 152 allows the disk formatter 30 to skip more than one sector while it consumes only one skip register 150.

The skip range check register 150 takes advantage of the fact that defective sectors are often found together in groups of contiguous or consecutive sectors. A disk formatter 30 (FIG. 1) with a single skip range check register 150 (FIG. 2B) can perform a read or write operation on the track 120 (with the defects shown) with a single defect management operation, instead of partitioning the operation into multiple parts. This reduces the time of a read or write operation and improves disk drive performance.

Figure 3:
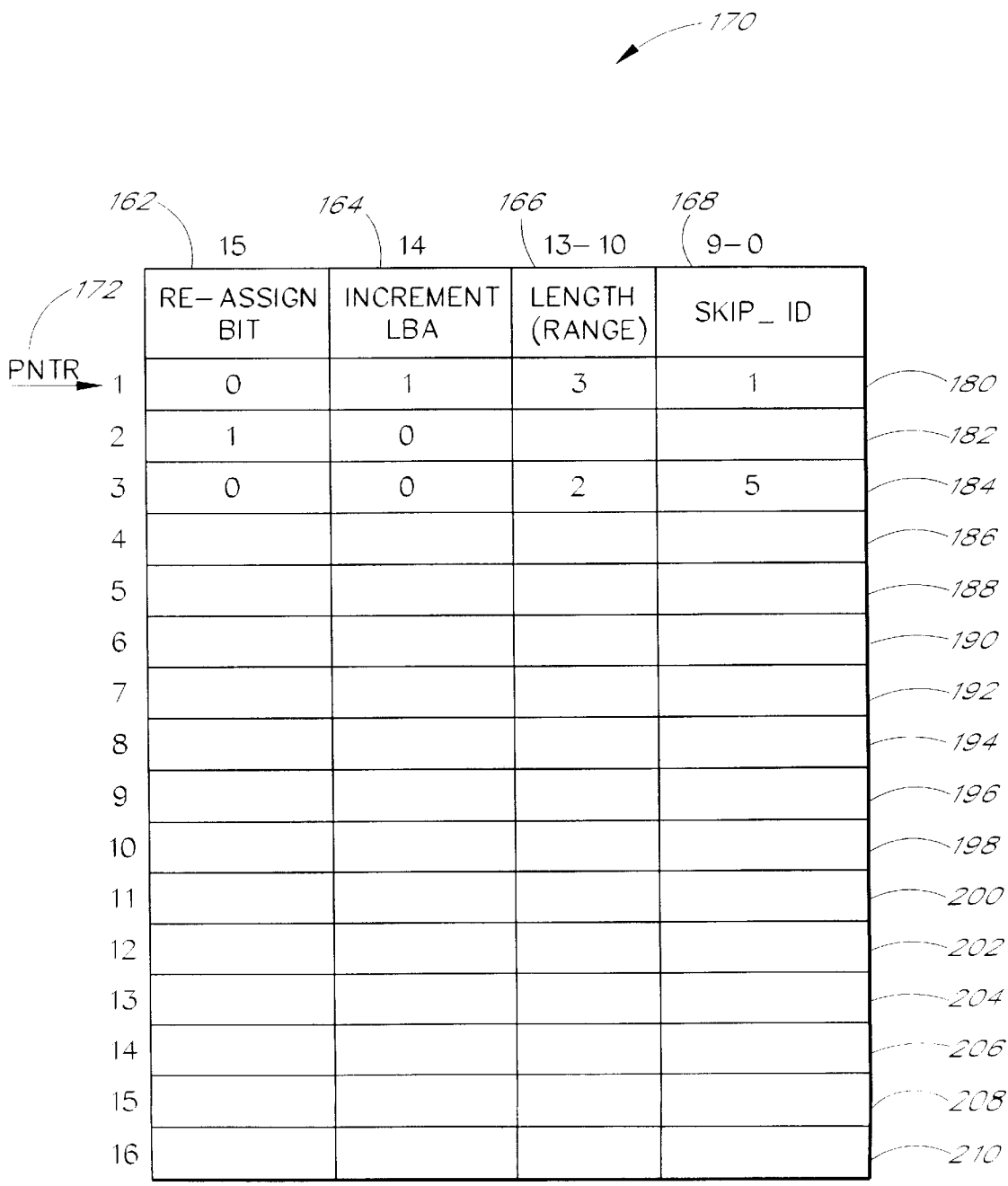
FIG. 3 illustrates one configuration of a set of skip range check registers in the disk drive of FIG. 1.

FIG. 3 illustrates one configuration of a set 170 of skip range check registers 180–210. Each register 180–210 may represent a bad sector or range of consecutive bad sectors. The skip range check registers 180–210 of FIG. 3 comprise a 10-bit SKIP_ID field 168, a 4-bit LENGTH field 166, an INCREMENT LBA bit 164 and a RE-ASSIGN bit 162. The SKIP_ID 168 specifies the location of a first sector to be skipped or re-assigned on the track 120. The LENGTH field 166 specifies the number of consecutive sectors to be skipped or re-assigned. A value of '0' in the LENGTH field 166 indicates that the skip range check register 160 contains an entry that is not valid. In other words, if LENGTH=0, then no skip is required.

The entries within the skip registers 180–210 are preferably loaded by the firmware 65 in ascending order. The location of the lowest physical sector or range of sectors to be skipped is loaded in the first skip register 180. The location of the second-lowest physical sector or range of sectors to be skipped is loaded in the second skip register 182, and so on. In this preferred configuration, there are no empty registers in between full registers. Thus, once an empty register is encountered by the skip check state machine 100, no further skip check registers need to be read. The advantages of loading the entries in ascending order with no empty registers in between full registers is explained below with reference to FIGS. 5 and 6.

Although 16 skip registers 180–210 are shown in FIG. 3, other embodiments of the present invention may have more or less than 16 skip registers. The skip check registers 105 in FIG. 1 preferably comprise the set 170 of skip range check registers 180–210 of FIG. 3. Alternatively, in other embodiments, the skip range check entries may be implemented with a first-in-first-out (FIFO) module or stack stored in a memory instead of registers 180–210.

Logical Block Addresses

The INCREMENT LBA bit 164 allows a read or write operation from the host system 5 to skip certain undesired sectors which are not defective. In general, the host system 5 perceives data as stored in a continuous sequence of logical block addresses (LBAs). The disk controller 15 controls the arrangement of how data is stored on the disk 25, and the firmware 65 controls the translation between LBAs and physical sector addresses. The mapping of LBAs to physical addresses preferably takes place transparently to the host system 5. Thus, logical block addresses may not match physical sector IDs on the disk.

For example, logical block addresses 1–19 used by the host 5 may be stored on sectors 8–26 of a first track of a first disk platter (not shown), LBA 20–22 may be stored on sectors 1, 5 and 6 of a second track of the first disk platter (as in FIG. 2B), and LBA 23–30 may be stored on sectors 1–8 of a track of a second disk platter. Furthermore, data sectors may be re-assigned to various physical sector IDs, but the logical block addresses still remain sequential.

The LBA counter 47 (FIG. 1) tracks the logical block addresses of the data sectors stored on the disk 25. When the disk controller 15 writes data to the disk 25, the LBA counter 47 is automatically incremented, and an assigned LBA value is inserted with the data as it is stored on a sector of the disk 25. There is no LBA value associated with skipped, defective sectors which were detected during manufacturing. The disk formatter 30 may automatically check the LBA value of each sector as it is read from the disk 25.

Increment LBA Bit

Figure 4:
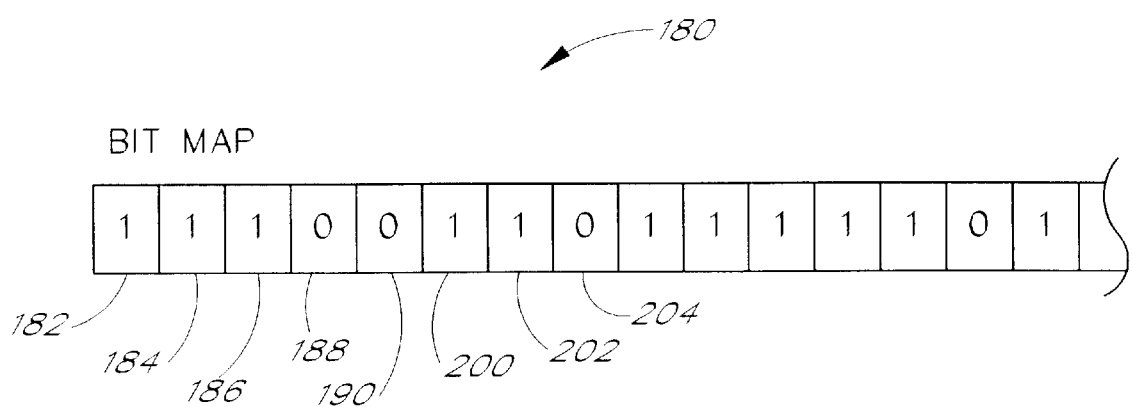
FIG. 4 illustrates one configuration of a bit map used by the disk drive of FIG. 1.

FIG. 4 illustrates one configuration of a list or bit map 180 which may be generated by the host system 5 (FIG. 1) in association with a read or write command from the host 5. The bit map 180 is stored in the RAM 60 when the disk drive 2 receives the bit map 180 from the host system 5. Alternatively, other means of informing the disk drive controller 15 to skip certain undesired sectors may be used instead of or in addition to the bit map 180 of FIG. 4.

In operation, the firmware 65 uses the bit map 180 to determine which logical block addresses are desired and which logical block addresses are not desired by the host system 5 in a particular read or write operation. Each bit 182–204 in the bit map 180 represents a logical block address which is associated with a physical sector address of a sector on a track. A '1' indicates a logical block address desired by the host 5 in a particular read or write command. A '0' indicates an undesired logical block address and a sector to be skipped by the disk controller 15. The firmware 65 uses the bit map 180 of FIG. 4 and the increment LBA bit 164 (FIG. 3) to coordinate the LBA counter 47 with sectors which are undesired by a particular read or write operation. Specifically, the firmware 65 uses the bit map 180 to configure entries in the skip check registers 105 (FIG. 1).

For example, in FIG. 4, the first three bits 182–186 are '1s' and the next two bits 188–190 are '0s.' This indicates that logical block addresses 1–3 will be used in a read or write operation, and logical block addresses 4–5 will not be used (undesired). The firmware 65 (FIG. 1) converts the bit map 180 to an entry for a skip range check register 180–210 (FIG. 3) to skip sectors associated with the logical block addresses 4–5. The firmware 65 sets the increment LBA bit 164 of the skip check register entry to a predefined state, such as '1,' and loads the length (range) field 166 (FIG. 3) with the value '2.' This indicates that the LBA counter 47 will be incremented by 2 for the two sectors skipped.

Thus, the increment LBA bit 164 indicates whether or not the LBA counter 47 should be incremented. The undesired (but not defective) sectors are skipped (not read or written), and the increment LBA bit 164 causes the LBA counter 47 to count the skipped sectors as if they had been valid and read or written. The ability to mark certain sectors undesired by a particular read or write operation adds more flexibility to the disk controller 15 and the skip check method, but is not essential.

Re-assign Bit

As described above, the re-assign bit 162 of FIG. 3 is loaded by the firmware 65 along with the rest of the fields 164–168. When the re-assign bit 162 is set to 1, this indicates that all sectors specified by the skip sector ID field 168 and the length field 166 have been re-assigned and should be skipped. In other words, all sectors in the range from SKIP_ID to SKIP_ID+(LENGTH-1) are to be skipped. Skipped sectors are not counted as part of the sector count (SEC_CNT).

Access to Skip Registers

Access by the microprocessor 20 to the set 170 of skip range check registers 190–210 is through a FIFO-like interface (not shown) which occupies a two-byte address space. Before the firmware 65 loads the skip check registers 180–210 for a read or write operation, the disk formatter 30 preferably initializes the FIFO interface by setting a 'skip FIFO initialize' bit in the disk formatter control register 101 of FIG. 1. Setting the skip FIFO initialize bit causes all the fields of each skip check register 190–210 to be reset to 0, including the length fields and the re-assign bits.

Address Logic and Pointer

The disk formatter 30 further comprises skip register address logic, such as a skip register address pointer PNTR 172, which points to a selected skip check register 180–210 as shown in FIG. 3. A load pointer variable is used by the firmware 65 to load the registers 180–210. A read pointer variable is used by the skip check state machine 100 to read the registers 180–210 after the registers 180–210 are loaded by the firmware 65.

At the beginning of a read or write operation, the disk formatter 30 resets the pointer PNTR 172 (load pointer variable) to '0.' When the firmware 65 (executed by the microprocessor 20) loads the skip check registers 180–210, the firmware 65 accesses and writes to a single address designated by the pointer 172 (load pointer variable). The disk formatter 30 automatically increments the PNTR 172 (load pointer variable) such that the skip check registers 180–210 in the set 170 are incrementally loaded. In one configuration, if there are more than 16 entries (more than the total number of implemented registers 190–210) written by the firmware 65 to the registers 180–210, then the pointer 172 (load pointer variable) wraps around the last register 210 and continues to increment through successive registers 180–210. The wrap-around nature of the pointer 172 (load pointer variable) causes the disk formatter 30 to over-write previous data in the registers 180–210.

When the pointer 172 is used by the skip check state machine 100, the pointer 172 (read pointer variable) will wrap-around the skip check range registers 180–210, but the skip check state machine 100 stops once it starts to wrap and causes the controller 15 to process the SEC_REQ.

Figure 5:
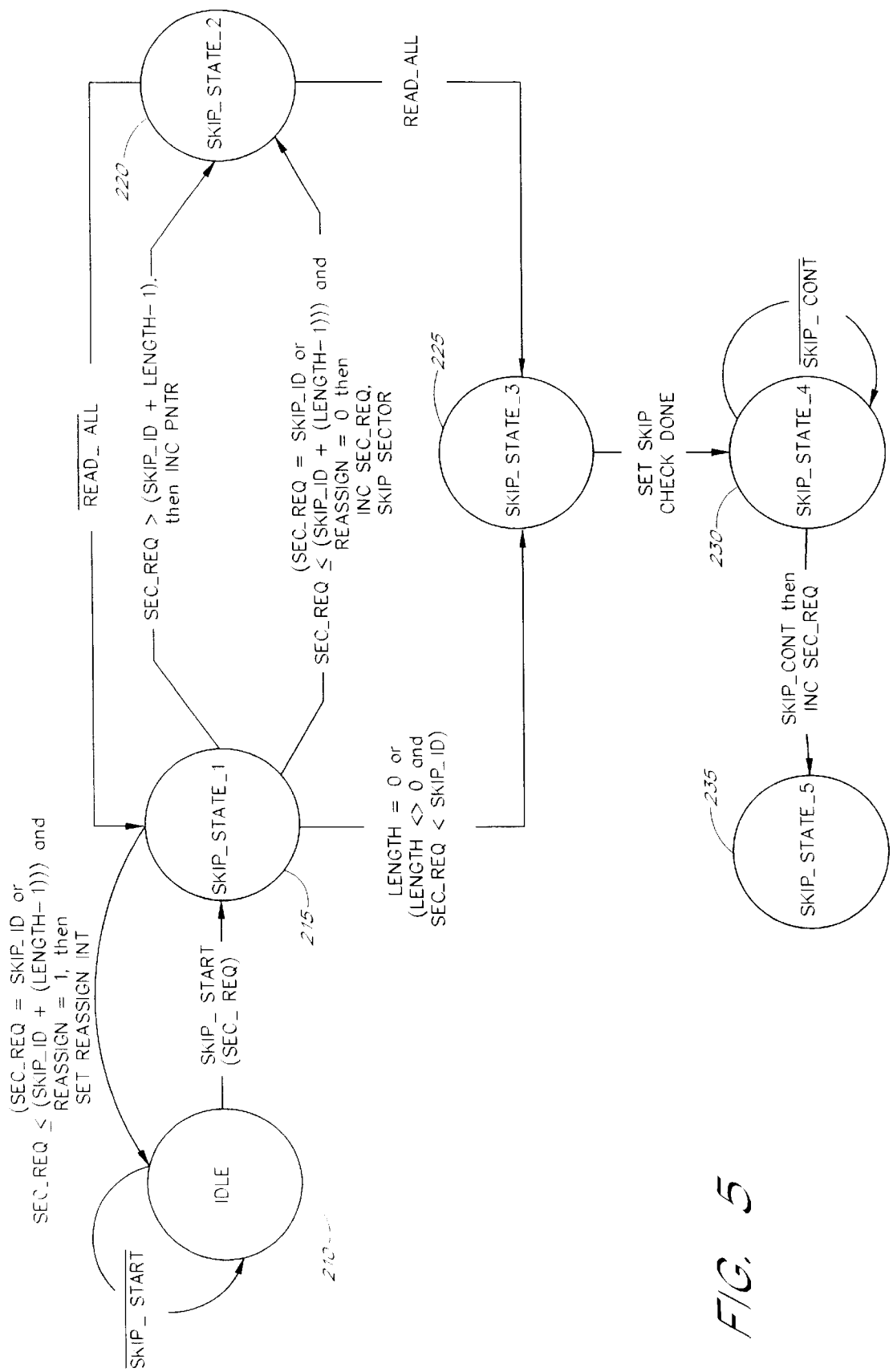
FIG. 5 illustrates one configuration of a state machine method performed by the disk drive of FIG. 1.
Figure 6:
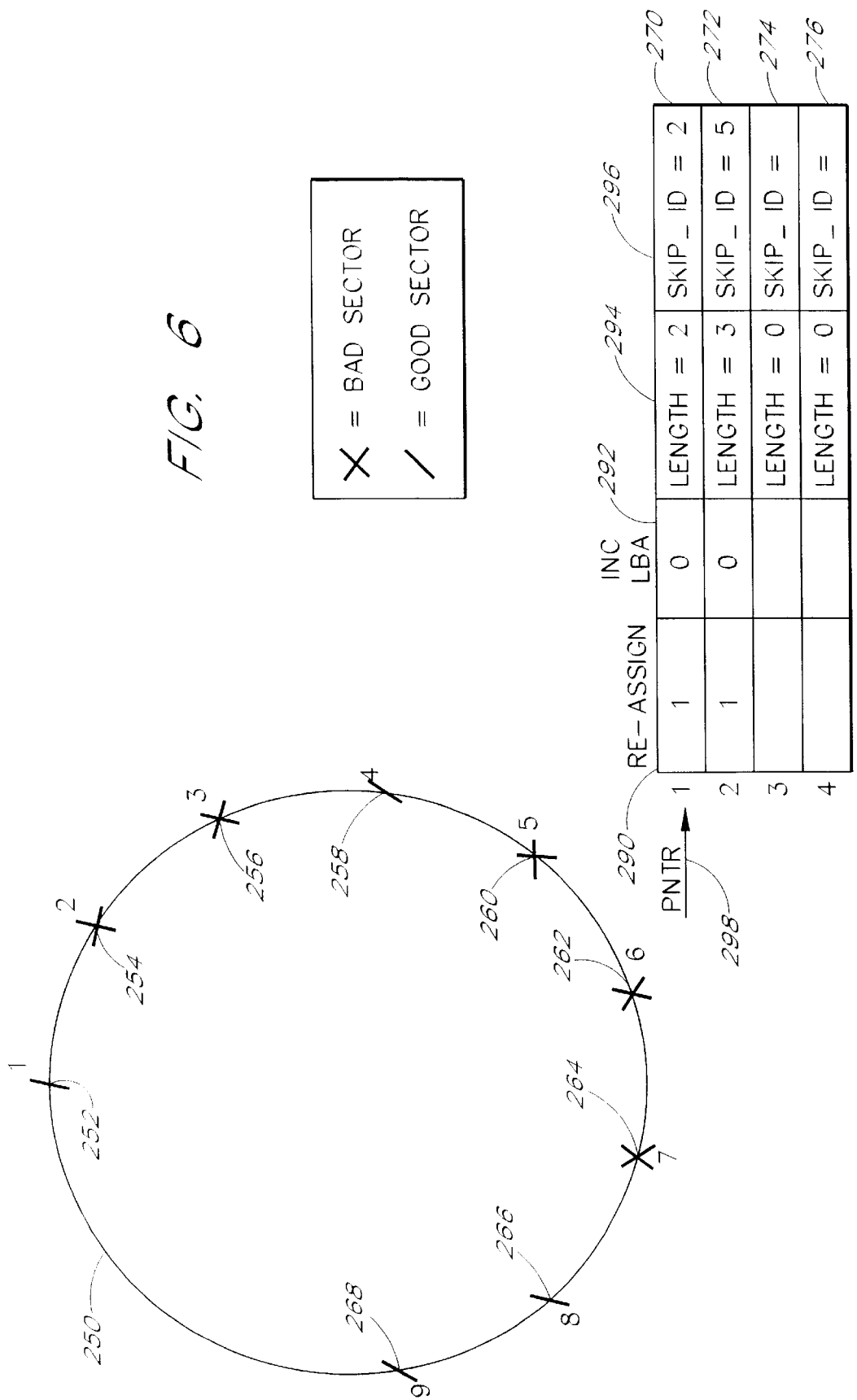
FIG. 6 illustrates an example of a track on a disk and a set of skip range check registers of FIG. 3.

Skip Check State Machine—FIGS. 5 and 6

FIG. 5 illustrates one embodiment of a skip check method performed by the skip check state machine 100 of FIG. 1. FIG. 6 illustrates an example of a track 250 with a plurality of sectors 252–268 and a set of skip range check registers 270–276, which are similar in structure to the skip range check registers 180–210 shown in FIG. 3.

The operation of the skip check state machine 100 is described with reference to FIGS. 1–6. In FIG. 1, the firmware 65 initializes and starts the main state machine 90 and the command state machine 102. The command state machine 102 starts the skip check state machine 100 and may wait for the skip check state machine 100 to finish. In FIG. 5, the skip check state machine 100 is initially in an idle state 210 waiting for a SKIP_START command from the command state machine 102. When the skip check state machine 100 receives a SKIP_START command, the state machine 100 proceeds to a SKIP_STATE_1 215. The command state machine 102 transfers the SEC_REQ 103 (ED of the next requested sector) to the sector pulse generator 92. In SKIP_STATE_1 215, the skip check state machine 100 receives the first value stored in SEC_REQ register 103 of FIG. 1 from the sector pulse generator 92 and compares this value with the skip sector ID (SKIP_ID) of the first skip check register 270. Initially, the PNTR 298 is on the first skip check register 270.

Re-assign

In SKIP_STATE_1 215, if SEC_REQ is equal to the skip sector ID of the first skip check register 270, and the re-assign bit 290 is set to 1, then the skip check state machine 100 sets a re-assign interrupt (as discussed below) and transfers control back to the command state machine 102 (or the main state machine 90). The skip check state machine 100 proceeds from SKIP_STATE_1 215 to the idle state 210. For example, in FIG. 6, if SEC_REQ=2 and SKIP_ID=2, then SEC_REQ=SKIP_ID. If the re-assign bit is set to 1, the disk formatter 30 may search the track or the disk 30 for the requested re-assigned data sectors. This search for re-assigned sectors may be directed by the firmware 65 and is preferably a separate process from the skip check state machine method as shown in FIG. 5.

In SKIP_STATE_1 215, if SEC_REQ is less than or equal to (SKIP_ID+(LENGTH−1)), this means that the SEC_REQ is within the range of sectors designated to be skipped by the first skip check register 270. For example, in FIG. 6, if SEC_REQ=3, and (SKIP_ID+(LENGTH−1))= 2+(2−1)=3, then SEC_REQ falls within the range of sectors designated to be skipped by the first skip check register 270. If the re-assign bit 290 is set to 1, then the skip check state machine 100 suspends its operation (proceeds to the idle state 210), sets a re-assign interrupt and transfers control back to the command state machine 102 (or the main state machine 90).

The re-assign interrupt informs the firmware 65 (FIG. 1) that the data has been re-assigned to another sector location. As described above, grown defects are detected and recorded typically when a sector is read, but the process may differ depending on the manufacturer's defined implementation. The data from each sector with a grown defect is re-assigned to a non-defective sector. In response to the re-assign interrupt, the firmware 65 determines where the data has been re-assigned, for example, by using a list of re-assigned sector addresses. The firmware 65 sends the re-assigned sector address with a new command to the disk formatter 30 for the re-assigned sector. The skip check state machine 100 remains in the idle state 210 until another SKIP_START command is received from the command state machine 102.

LENGTH=0

In SKIP_STATE_1 215, if the LENGTH field 294 is equal to '0,' then the skip check entry is not valid, and no skip is required. For example, in FIG. 6, if the LENGTH fields of all the registers 270–276 are '0,' then there are no skips required. The skip check state machine 100 then proceeds to a SKIP_STATE_3 225, which indicates that a 'good' sector has been found by the skip check state machine 100, and the disk formatter 30 may read from or write to the sector, as described below.

SEC_REQ<SKIP_ID

In SKIP_STATE_1 215, if the LENGTH field is not equal to zero, and SEC_REQ is less than SKIP_ID, this means that the requested sector address is lower than the SKIP_ID of the skip check register currently designated by the pointer PNTR 298, which in this case is the first skip register 270. For example, in FIG. 6, if SEC_REQ=1 and SKIP_ID=2, then SEC_REQ<SKIP_ID. If SEC_REQ is less than the SKIP_ID of the first skip check register 270, then the requested sector address (SEC_REQ) is lower than the SKIP_ID of all the skip check registers 270–276 because of the ascending order.

This is an advantage of the skip check registers' ascending order because the skip check state machine 100 does not need to check the entries of all the skip check registers 270–276. As soon as the skip check state machine 100 finds a SEC_REQ<SKIP_ID condition, the skip check state machine 100 can immediately return an enable signal to command state machine 102 and/or the main state machine 90 to read or write the requested sector SEC_REQ. The skip check state machine 100 proceeds from SKIP_STATE_1 215 to SKIP_STATE_3 225.

Skip Check Done

In SKIP_STATE_3 225, the skip check state machine 100 proceeds to a SKIP_STATE_4 230, which indicates that the skip check procedure is done for the sector currently designated by SEC_REQ. The skip check state machine 100 returns control back to the command state machine 102 and/or the main state machine 90. The disk formatter 30 causes the disk drive 15 (FIG. 1) to read or write the sector designated by SEC_REQ on the track 250. For example, in FIG. 6, the disk formatter 30 causes the disk drive 15 to read or write to the sector 252 at SEC_REQ=1.

The command state machine 102 decrements the total number of requested sectors SEC_CNT) in the SEC_CNT register 104 after a sector is successfully found and read. When the SEC_CNT reaches zero, there are no more sectors associated with that particular read or write operation, and the read or write operation is complete.

Skip Check Continue

In SKIP_STATE_4 230, the skip check state machine 100 waits for a signal from the command state machine 102 and/or the main state machine 90. If there are more sectors to be read or written in the read or write operation (SEC_CNT is not equal to zero), the command state machine 102 causes the sector pulse generator 92 to send another sector pulse to the skip check state machine 100. The command state machine 102 sends a SKIP_CONT command to the skip check state machine 100 to continue the skip check process for the next sector. The skip check state machine 100 proceeds from SKIP_STATE_4 230 to a SKIP_STATE_5 235. The skip check state machine 100 increments the sector requested, SEC_REQ, to point to the next sector on the track and starts the skip check method again.

For example, if SEC_REQ is 1, then it is incremented to SEC_REQ+1=2. The skip check state machine 100 then proceeds to SKIP_STATE_1 215 and performs the skip check procedure on the next SEC_REQ value, which is SEC_REC+1=2.

The skip check state machine 100 preferably checks the next requested sector (SEC_REQ+1) to be read or written while the disk formatter 30 reads the present requested sector (SEC_REQ). This saves time and improves the efficiency of a read or write operation.

Increment Pointer

In SKIP_STATE_1 215, if SEC_REQ is greater than (SKIP_ID+(LENGTH−1)), this means that the requested sector address is higher than the SKIP_ID of the skip check register currently designated by the pointer PNTR 298. For example, in FIG. 6, if SEC_REQ=4, SKIP_ID=2, and (LENGTH−1)=1, then (SKIP_ID+(LENGTH−1))=1, and SEC_REQ>(SKIP_ID+(LENGTH−1)). The skip check state machine 100 proceeds from SKIP_STATE_1 215 to SKIP_STATE_2 220 shown in FIG. 5. The skip check state machine 100 increments the pointer PNTR 298 to point to the next skip check register 272. Because the skip check register values are organized in ascending order, the next skip check register 272 contains the sector address of the next highest sector or range of sectors, if any, to be skipped on the track 250.

Read_All Signal

In SKIP_STATE_2 220, the skip check state machine 100 reads the SKIP_ID of the next skip check register 272. If there are no more entries in the skip check registers, i.e. the skip check registers 272–276 are empty or LENGTH=0, then an internal signal READ_ALL is generated to the command state machine 102, which indicates that the skip check state machine 100 has examined all of the skip check registers 270–276 and found no more sectors to skip. This an advantage of having no empty skip check registers in between full skip check registers. The skip check state machine 100 does not need to check each skip check register 270–276. The skip check state machine 100 proceeds from SKIP_STATE_2 220 to SKIP_STATE_3 225.

In SKIP_STATE_2 220, if there are more entries in the skip check registers 270–276, then the skip check state machine 100 returns to SKIP_STATE_1 215. For example, in FIG. 6, the PNTR 298 is incremented to point to the second skip check register 272. The second skip check register 272 contains an entry. The skip check state machine 100 returns to SKIP_STATE_1 215 to compare the current value in the SEC_REQ register 103 with the values stored in the second skip check register 272.

SEC_REQ Falls within Skip Range, Re-assign=0, Increment SEC_REQ

In SKIP_STATE_1, if the sector requested SEC_REQ equals the SKIP_ID 296 or is within the range of sectors designated by the first skip check register 270 to be skipped, and the re-assign bit 290 is equal to 0, then the skip check state machine 100 increments the SEC_REQ to SEC_REQ+1. Thus, the sector at SEC_REQ along the track 250 is skipped by the skip check state machine 100 and is not processed during the read or written operation. For example, in FIG. 6, if SEC_REQ=2, SKIP_ID=2 and (SKIP_ID+ (LENGTH−1))=3, then the sector 254 at SEC_REQ=2 is skipped as SEC_REQ is incremented by 1. The skip check state machine 100 then proceeds from SKIP_STATE_1 215 to SKIP_STATE_2 220.

As described above, in SKIP_STATE_2, the skip check state machine 100 reads the SKIP_ID of the next skip check register 272. If there is no entry in the next skip check register 272, then the skip check state machine 100 generates a signal READ_ALL to the command state machine 102. The skip check state machine 100 proceeds from SKIP_STATE_2 220 to SKIP_STATE_3 225. If there is another entry in the next skip check register 272, then the skip check state machine 100 returns to SKIP_STATE_1 215. The skip check state machine 100 then performs a skip check on the next SEC_REQ value (SEQ_REQ+1).

In summary, when the skip check state machine 100 proceeds from SKIP_STATE_1 215 to SKIP_STATE_2 220, the skip check state machine 100 either increments the SEC_REQ register 103 (to skip over a defective sector) or increments the pointer PNTR 298 (to point to the next skip check register). The path from SKIP_STATE_2 220 back to SKIP_STATE_1 215 indicates that the skip check state machine 100 has not checked all the possible entries of the skip check registers 270–276. The path from SKIP_STATE_2 220 to SKIP_STATE_3 225 indicates that the skip check state machine 100 has checked all the entries of the skip check state registers 270–276 and found no more defective sectors to skip.

While embodiments and applications of this invention have been shown and described, it will be apparent to those skilled in the art that various modifications are possible without departing from the scope of the invention. It is, therefore, to be understood that within the scope of the appended claims, this invention may be practiced otherwise than as specifically described.

What is claimed is:

1. A disk drive controller in a disk drive configured to read and write data to one or more sectors on one or more tracks of a disk as requested by a host system, the disk drive controller comprising:

at least one register configured to store:

a sector address of a first sector to be skipped during a read or write operation, a range value which indicates a number of consecutive sectors to be skipped during the read or write operation, wherein at least some of the sectors to be skipped have grown defects, and a re-assign bit which indicates whether the disk drive controller has re-assigned data from one or more defective sectors of the disk to non-defective other sectors on the disk, and the reassign bit indicates the consecutive sectors that should be skipped;

and a control circuit configured to use the sector address and the range value to skip a range of consecutive sectors during the read or write operation.

2. The disk drive controller of claim 1, wherein the control circuit is configured to compare each sector specified by the host system during a read or write operation with the one or more consecutive sectors to be skipped, said control circuit causing the disk drive to skip the sectors at the one or more consecutive sector addresses stored in the at least one register.

3. The disk drive controller of claim 1, wherein at least some of the sectors to be skipped have manufacturing defects.

4. The disk drive controller of claim 1, further comprising a plurality of registers, each register configured to store:

a sector address of a first sector to be skipped during the read or write operation; and a range value which indicates a number of consecutive sectors to be skipped during the read or write operation.

5. The disk drive controller of claim 4, in combination with firmware configured to respond to a read or write command from the host system by at least accessing a list of defective sectors to identify one or more ranges of consecutive sectors to be skipped, and loading the at least one register with the identified one or more ranges of consecutive sectors to be skipped.

6. The disk drive controller of claim 4, in combination with a microprocessor programmed to respond to a read or write command from the host system by at least accessing a list of defective sectors to identify one or more ranges of consecutive sectors to be skipped, and loading the at least one register with the identified one or more ranges of consecutive sectors to be skipped.

7. The disk drive controller of claim 1, wherein the control circuit comprises a state machine.

8. A method of skipping one or more sectors on a disk of a disk drive during a read or write operation requested by a host system, the method comprising:
   generating a list of sectors to be skipped during a read or write operation using a master defect list and at least one sector identified by a host in the read or write operation;
   identifying within the generated list at least one range of consecutive sectors to be skipped;
   converting the range into an address and a range value to generate a compressed list;
   loading the compressed list into a set of registers of a disk drive controller; and
   skipping the sectors identified with the address and the range value in the compressed list during the reading from or writing to the disk.

9. The method of claim 8, wherein the generated list comprises at least some sectors having manufacturing defects.

10. The method of claim 8, wherein the generated list comprises at least some sectors having grown defects.

11. The method of claim 8, wherein the generated list comprises at least some sectors having manufacturing defects and at least some sectors having grown defects.

12. The method of claim 8, wherein the act of generating, identifying, converting and loading are performed by a microprocessor under the control of a firmware program.

13. The method of claim 8, wherein the act of skipping the sectors is performed by a state machine.

14. The method of claim 8, wherein the act of generating a list of sectors comprises using a bit map associated with the read or write operation.

15. The method of claim 14, wherein the disk drive controller increments a logical block address (LBA) counter for each sector designated by the bit map.

16. The method of claim 8, wherein the generated list comprises at least some sectors having no defects.

17. A method of skipping one or more sectors on a disk of a disk drive during a read or write operation requested by a host system, the method comprising:
   generating a list of sectors to be skipped during a read or write operation using a master defect list and at least one sector identified by a host in the read or write operation;
   identifying within the generated list at least one range of consecutive sectors to be skipped;
   converting the range into an address and a range value to generate a compressed list;
   loading the compressed list into a set of registers of a disk drive controller; wherein the act of loading the compressed list into a set of registers of a disk drive controller comprises loading the registers in ascending order with no empty registers in between fill registers; and
   skipping the sectors identified with the address and the range value in the compressed list during the reading from or writing to the disk.

18. The method of claim 17, wherein the generated list comprises at least some sectors having manufacturing defects.

19. The method of claim 17, wherein the generated list comprises at least some sectors having grown defects.

20. The method of claim 17, wherein the generated list comprises at least some sectors having manufacturing defects and at least some sectors having grown defects.

21. The method of claim 17, wherein the act of generating, identifying, converting and loading are performed by a microprocessor under the control of a firmware program.

22. The method of claim 17, wherein the act of skipping the sectors is performed by a state machine.

23. The method of claim 17, wherein the act of generating a list of sectors comprises using a bit map associated with the read or write operation.

24. The method of claim 23, wherein the disk drive controller increments a logical block address (LBA) counter for each sector designated by the bit map.

25. The method of claim 17, wherein the generated list comprises at least some sectors having no defects.

26. A method of skipping one or more sectors on a disk of a disk drive during a read or write operation requested by a host system, the method comprising:
   generating a list of sectors to be skipped during a read or write operation using a master defect list and at least one sector identified as a sector that has been re-assigned to a non-defective sector because of a grown defect;
   identifying within the generated list at least one range of consecutive sectors to be skipped;
   generating a compressed list by converting the range into an address and a range value and including a re-assign bit identifying the at least one sector;
   loading the compressed list into a set of registers of a disk drive controller; and
   skipping the sectors identified with the address and the range value in the compressed list during the reading from or writing to the disk.

27. The method of claim 26, further comprising searching for the at least one sector that has been re-assigned.

28. A disk drive controller in a disk drive configured to read and write data to one or more sectors on one or more tracks of a disk as requested by a host system, the disk drive controller comprising:
   at least one register configured to store:
      a sector address of a first sector to be skipped during a read or write operation,
      a range values which indicates a number of consecutive sectors to be skipped during the read or write operation, wherein at least some of the sectors to be skipped are explicitly designated by the host system during the read or write operation and the range of values is loaded as a compressed list in ascending order; and
   a control circuit configured to use the sector address and the range value to skip a range of consecutive sectors during the read or write operation.

29. The disk drive controller of claim 28, wherein the register is further configured to store an increment logical block address bit, such that when the increment logical block address bit is in a predefined state, a logical block address counter within the disk drive is incremented during the read or write operation by the number of sectors explicitly designated by the host system to be skipped.

* * * * *

UNITED STATES PATENT AND TRADEMARK OFFICE
CERTIFICATE OF CORRECTION

PATENT NO.     : 6,470,461 B1                                      Page 1 of 1
DATED          : October 22, 2002
INVENTOR(S)    : Daniel R. Pinvidic et al.

It is certified that error appears in the above-identified patent and that said Letters Patent is hereby corrected as shown below:

<u>Column 15,</u>
Line 27, insert -- wherein the act of loading the compressed list into a set of registers of a disk drive controller comprises loading the registers in ascending order; -- after "controller;".

Signed and Sealed this

Fourteenth Day of October, 2003

JAMES E. ROGAN
*Director of the United States Patent and Trademark Office*